United States Patent [19]

Blackham

[11] Patent Number: 5,696,849
[45] Date of Patent: Dec. 9, 1997

[54] CASCADED ANTI-ALIASING FILTER CONTROL FOR SAMPLED IMAGES

[75] Inventor: Raymond C. Blackham, Penn Valley, Calif.

[73] Assignee: Tektronix, Inc., Wilsonville, Oreg.

[21] Appl. No.: 418,357

[22] Filed: Apr. 7, 1995

[51] Int. Cl.⁶ .................................................. G06K 9/40
[52] U.S. Cl. .......................... 382/260; 382/301; 382/302; 382/303; 348/571; 348/578; 348/580; 348/409; 358/183; 371/22.1; 395/164
[58] Field of Search .................... 382/56, 54, 260, 382/301, 302, 236, 269, 303; 348/571, 578, 580, 409; 371/16; 358/22, 183; 395/164

[56] References Cited

U.S. PATENT DOCUMENTS

| | | | |
|---|---|---|---|
| 4,821,269 | 4/1989 | Jackson et al. | 371/22.1 |
| 4,885,787 | 12/1989 | Okamoto et al. | 382/260 |
| 5,173,948 | 12/1992 | Blackham et al. | 382/293 |
| 5,206,729 | 4/1993 | Nakata et al. | 358/182 |
| 5,227,863 | 7/1993 | Bilbrey et al. | 348/578 |
| 5,561,723 | 10/1996 | DesJardins et al. | 382/260 |

Primary Examiner—Leo Boudreau
Assistant Examiner—Daniel G. Mariam
Attorney, Agent, or Firm—Francis I. Gray

[57] ABSTRACT

A cascaded anti-aliasing filter control circuit for sampled images has a plurality of video effects modules coupled in a chain, each module performing a particular transform of a cascaded video effect. An input module has as inputs constants for the particular transform and a pixel address signal, and provides as outputs a new pixel address signal and a set of partial derivative signals. The new pixel address signal is input to a next module in the chain as the pixel address signal, and the set of partial derivative signals are input to a matrix multiplier. A set of partial derivative signals from the next module also are input to the matrix multiplier to produce an intermediate set of partial derivative signals. A last module has as inputs the new pixel addresses from a prior module and constants for a final one the particular transforms for the cascaded video effect, and provides as outputs a final set of partial derivative signals which are combined in an output matrix multiplier with the set of partial derivative signals from a prior matrix multiplier to produce an output set of partial derivative signals from which filter control signals are generated.

5 Claims, 3 Drawing Sheets

CASCADED ANTI-ALIASING FILTER CONTROL FOR SAMPLED IMAGES

BACKGROUND OF THE INVENTION

The present invention relates to video anti-aliasing filters, and more particularly to a method of producing anti-aliasing filter control signals for the projection of sampled images where the image projection may have several cascaded effects.

A three-dimensional digital video effects system maps (transforms) an input (source) video image that is two-dimensional into a three-dimensional space, and performs a perspective projection of the mapped image back into two dimensions for eventual display as an output (target) video image on a viewing screen. The source image is in the form of a two-dimensional array of picture elements (pixels) or sample points. This array of sample points is resampled into the target image, which also is a two-dimensional array of pixels or sample points.

Because the mapping or transformation of the source image into three-dimensional space and back into the target image results in varying amounts of compression (resizing) of the source image as it appears in the target image, the resampling operation often results in an undersampling of the source image detail as it appears in the target image. Image undersampling may produce the effect commonly known as "aliasing." Aliasing arises whenever the two-dimensional frequency content of the source image is greater than half of the two-dimensional sampling rate of that image by the resampling process in forming the target image. The visual effects that result from aliasing include a displeasing graininess in the target image, ragged edges, and the creation of artifacts not present in the source image.

Aliasing may be reduced by lowpass filtering the source image prior to resampling so as to reduce the high frequency image components at and above the resampling rate. However excessive lowpass filtering of the source image, with a cutoff frequency that is much below the resampling frequency, causes the target image to look bluffed. Therefore it is important to know exactly how much compression of the source image has to take place so that the anti-aliasing lowpass filtering may be minimized and yet be effective. A useful rule is that the cutoff frequency of the anti-aliasing filter, normalized to the sample rate of the source image, be 1/(2.0 times the amount of the compression).

The amount of compression of the source image as it appears in the target image arises from stretching the picture into the desired three-dimensional shape and from the perspective projection of the result. The compression may be measured in any direction; in this implementation it is measured in the horizontal and vertical directions as well as in the direction corresponding to ±45 degrees. Because these factors vary from point to point within a transformed image, determining the cut-off frequency for the lowpass filtering process is preferably accomplished locally within the image, ideally on a pixel-by-pixel basis, so that only the minimum necessary amount of filtering is performed. Thus the compression factors should be calculated in video real time.

A prior method used to produce filter compression factor control signals, such as that in the Kaleidoscope Digital Picture Manipulator (DPM) manufactured by The Grass Valley Group, Inc. of Grass Valley, Calif., United States of America and described in U.S. Pat. No. 4,700,232 issued October 13, 1987 to John Abt et al entitled "Interpolator for Television Special Effects System", relies upon the projection of several points from the neighborhood of each sampled point in a source image to their respective locations in a target image under a chosen projection effect. The magnitudes of the differences between the destinations of these points are calculated and then used to determine how much the image will be compressed in the neighborhood of the corresponding source image sample. In order to save hardware costs or software execution time, the neighboring points are chosen to be neighboring image samples, so that each sample is projected onto the target image once and then used several times to estimate the amount of compression for itself and for several of its neighboring image samples.

There are two problems with this approach. First, the differences between the projection of neighboring points are small with respect to their coordinates in the target image, particularly when there is a large amount of compression of the source image. This is inherently unstable numerically. The projection calculations, which usually include division, must be taken out to many bits of accuracy to get a few bits of accuracy for the measures of the resulting compression amounts. Second, using neighboring points for neighborhood points assumes that the projection effect is continuous. For discontinuous effects, such as a split or tear, compression factors calculated in this manner are not correct along the edges of the discontinuity. This may cause aliasing artifacts to appear along these edges. Once the differences are calculated, they still must be processed to create compression values that may be used to control the cutoff frequencies of anti-aliasing filters.

Another method used in the past, such as in the DPM-700 manufactured by The Grass Valley Group, Inc., is to create an approximating function for the filter control signal values. The disadvantage of this method is that a new approximating function, along with the software or hardware to implement it, must be created for each new combination of projection effects. This results in a complicated and expensive design that covers all effects and that must be replaced every time a new effect is added, and/or in the abandonment of correct anti-alias filter control for some effects.

What is desired is a cascaded anti-aliasing filter control for sampled images that allows cascaded effects to be separately broken out, such as mapping a source image onto a ball, pulling the ball into a banana shape, and projecting the result back onto a target screen.

SUMMARY OF THE INVENTION

Accordingly the present invention provides an apparatus for producing anti-aliasing filter control signals for the mapping of sampled images that allows cascaded effects to be broken out and separately handled. A filter control signal circuit is in the form of modules coupled together in a chain, each module having a transform circuit and a partial derivative circuit. Each module performs one transformation component of a composite map. The outputs from each module are a set of partial derivatives and pixel addresses. The inputs to each module are pixel addresses from a prior module in the chain. The partial derivative outputs from two successive modules are input to a matrix multiplier. The last module in the chain only has a partial derivative circuit to provide inputs to an output matrix multiplier. The outputs from the output matrix multiplier are convened into adaptive filter coefficients to control the lowpass filtering of an input video signal on a pixel-by-pixel basis.

The objects, advantages and other novel features of the present invention are apparent from the following detailed description when read in conjunction with the appended claims and attached drawing.

DESCRIPTION OF THE PREFERRED EMBODIMENT

In mathematical terms the derivative of any continuous function at a given point in its domain is a linear map between the respective input and output tangent spaces for that point, so that the derivative of a composite function may be broken down into a series of simple linear transformations. Stated another way, the derivative of a composite function may be calculated from the derivative of its constituent functions using the well-known chain rule. In applying this mathematical concept to transforming a sampled image from a source image to a target image for a given projection effect, the elements of this composite function derivative, which may be represented by a matrix, may be used to calculate the amounts of compression resulting from the given projection effect. For the present illustration both the source and target images are two-dimensional spaces, so the derivative is a 2×2 matrix of the partial derivatives of the mapping function from source space to target space. For three-dimensional applications the derivative is a 3×3 matrix of the partial derivatives of the mapping function from source space to target space.

Figure 3:
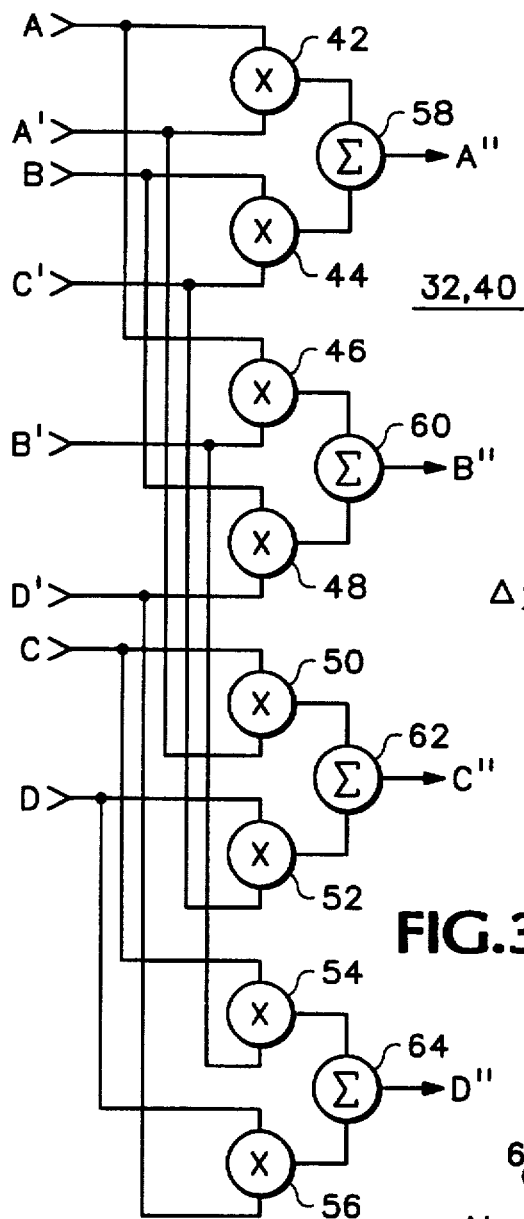
FIG. 3 is a block diagram view of a 2×2 matrix multiplier circuit for the cascaded anti-aliasing filter control circuit according to the present invention.

Each of the component functions of a cascaded projection effect produces four values which are functions of a point from the source image that has been mapped through all of the preceding parts of the cascade. To do this, each source sample is mapped through each of the cascaded effects in turn. The coordinates of the mapped source point after each of the maps in this cascade are used as inputs to functions that calculate the four elements of the 2×2 derivative matrix for the next map in the cascade. The point does not have to be projected through the last map in the cascade, which is usually the final perspective projection onto the display screen, because there are no more 2×2 derivative matrices to calculate. The derivative matrix for the cascaded projection effect is the product of all of these individual matrices. Therefore for each component function of the cascaded map, except for the final perspective projection, the point is mapped from the domain to the range of the function, and four partial derivative functions are evaluated and multiplied as a 2×2 matrix times the incoming 2×2 matrix. This matrix multiplication has four operations of the form AB+CD, as shown in FIG. 3.

Figure 4:
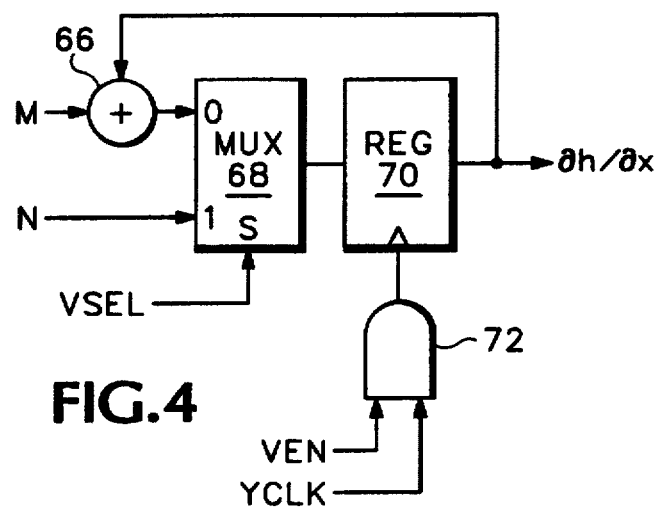
FIG. 4 is a block diagram view of a representative partial differentiation circuit for the first stage of the cascaded anti-aliasing filter control system according to the present invention.

The final component function is the planar perspective projection, and is of the form $$(h,v) = \{(Ax+By+C)/(Gx+Hy+I), (Dx+Ey+F)/(Gx+Hy+I)\}$$

where (x,y) are input coordinates, (h,v) are output target space coordinates and A–I are constants determined by the particular planar mapping transformation function. Taking the partial derivatives of these with respect to x and y produces four functions, each having the same denominator $(Gx+Hy+I)^{*}$ *2. For basic three-dimensional planar effects which have a two-dimensional to three-dimensional affine transformation of the source image followed by a perspective projection onto the output image sample grid, the numerators of these functions are simple ramps in x or y, and may be implemented as accumulators, as shown in FIG. 4. For more complicated effects the input x and y values pass through a more complex function to produce the numerators. The basic hardware takes these four numerators and the square root of the denominator and produces the corresponding filter control selection values.

Figure 1:
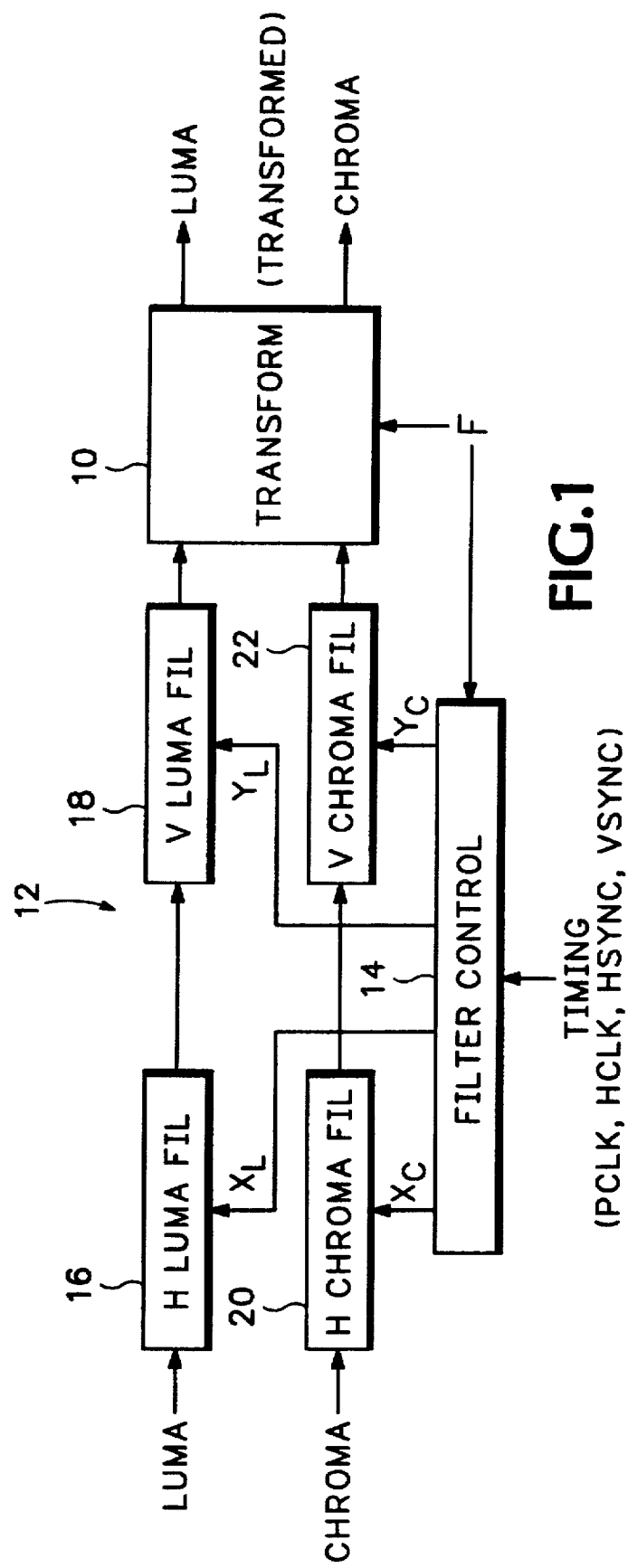
FIG. 1 is a simplified block diagram view of a digital video effects system that uses a cascaded anti-aliasing filter control system for sample images according to the present invention.

Referring now to FIG. 1 luminance and chrominance video components are applied to a two-dimensional to three-dimensional to two-dimensional video transform circuit 10 through a set of adaptive lowpass filters 12 under control of a filter control circuit 14. The set of adaptive lowpass filters 12 may include an adaptive horizontal luminance lowpass filter 16, an adaptive vertical luminance lowpass filter 18, an adaptive horizontal chrominance lowpass filter 20 and an adaptive vertical chrominance lowpass filter 22.

The video transform circuit 10 receives operator controls that determine how the planar source image is to be manipulated in the three-dimensional space. For three-dimensional planar transforms, this input determines a transform matrix function, F, that the filter control circuit 14 receives from the video transform circuit 10.

$$F = \begin{vmatrix} A & B & C \\ D & E & F \\ G & H & I \end{vmatrix}$$

The video transform circuit 10 uses the transform matrix F to map source space pixels (Xs, Ys) to intermediate three-dimensional variables (Xi, Yi, Zi) as follows:

$$\begin{vmatrix} Xi \\ Yi \\ Zi \end{vmatrix} = \begin{vmatrix} A & B & C \\ D & E & F \\ G & H & I \end{vmatrix} * \begin{vmatrix} Xs \\ Ys \\ 1 \end{vmatrix}$$

The transformed target image is derived from the intermediate three-dimensional variables using perspective projection onto an output plane (the display screen) in Zt=0 according to the following equations:

$$Xt=Xi/Zi$$

$$Yt=Yi/Zi$$

More complex effects have several more equations Xt=Xi(x,y)/Zi, Yt=Yi(x,y)/Zi, where Xi and Yi may themselves be composite functions of two or more variables.

The filter control circuit 14 uses the information contained in the transform matrix function F to determine how much compression is going to occur in the immediate region of each pixel, and produces on a pixel-by-pixel basis a filter compression factor (FCF) control signal for each of the adaptive lowpass filters 12. Each adaptive lowpass filter 12 has, for example, 128 different settings that vary from no filtering, which is appropriate for a compression factor of 1:1 or image expansion, to an appropriate maximum level of filtering which corresponds to some larger compression factor, such as 16:1.

Figure 2:
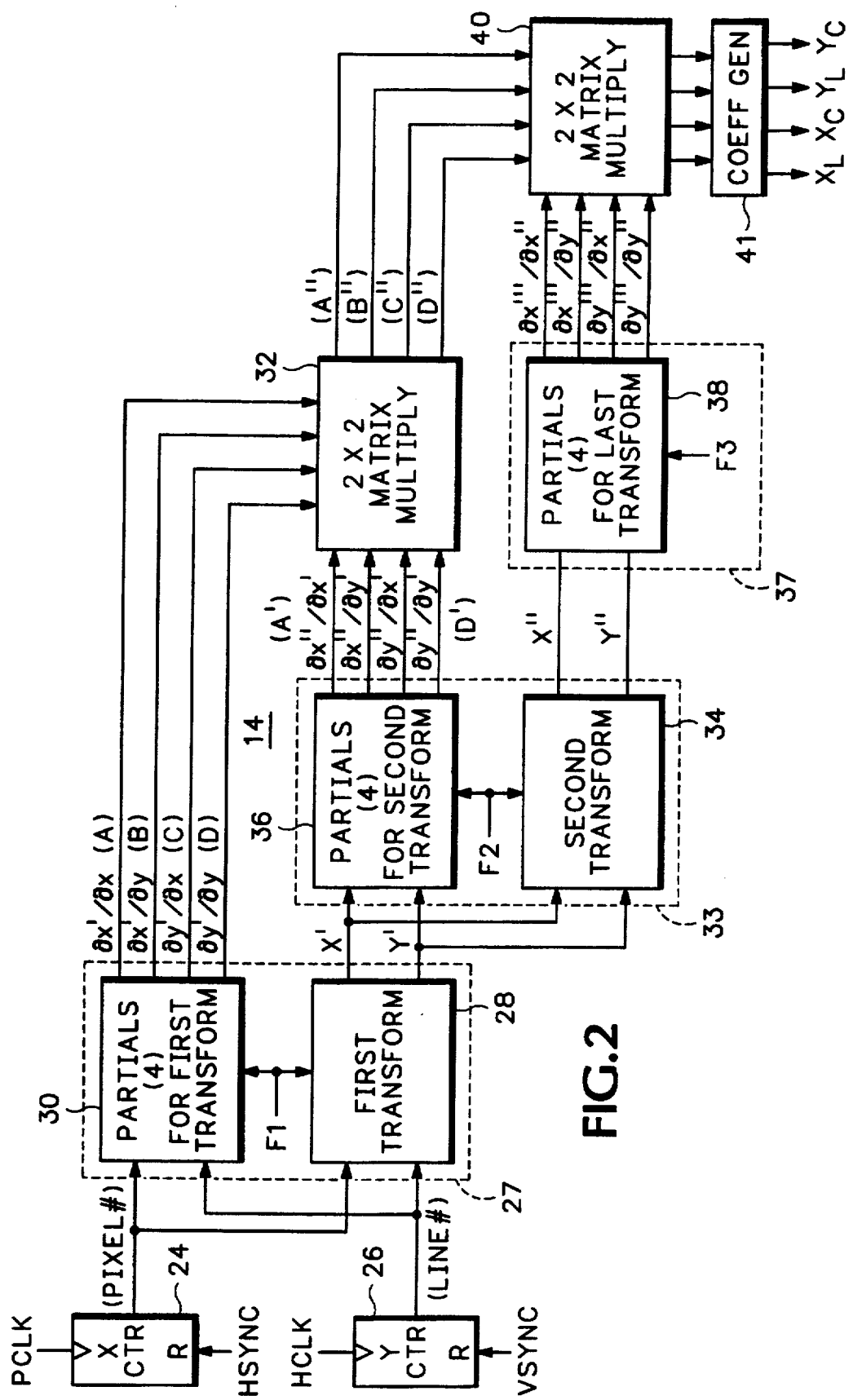
FIG. 2 is a block diagram view of a cascaded anti-aliasing filter control system for sampled images according to the present invention.

A portion of the filter control circuit 14 is shown in greater detail in FIG. 2. An X counter 24 counts pixel or sample clock pulses PCLK to generate as an output a pixel or sample number along a video line. The X counter 24 is reset by each horizontal sync pulse HSYNC at the beginning of each active video line. A Y counter 26 counts line clock pulses HCLK to generate as an output a line number for a video field. The Y counter 26 is reset by each vertical sync pulse VSYNC at the beginning of each video field. The X,Y outputs define a pixel address for the source image. The pixel addresses from the counters 24, 26 are input to a first module 27. The first module 27 includes a transform circuit 28 which has as input the parameters F1 for a first transformation of a cascaded video effect, where F=f{F1,F2, . . . Fn}, to produce first intermediate image pixel addresses (X',Y'). The pixel addresses from the counters 24, 26 also are input to a first partial differentiation circuit 30 in the first module 27 to produce partial derivative signals D1=f{dX'/dX,dX'/dY,dY'/dX,dY'/dY} for the first transformation. The partial derivative signals for the first transformation are input to a first 2×2 matrix multiplier 32.

The first intermediate image pixel addresses are input to a second module 33 including transformation circuit 34 and partial derivative circuit 36, to which also are input parameters F2 for a second transformation of the cascaded effect. The second transformation circuit 34 outputs second intermediate image pixel addresses (X",Y"), and the second partial derivative circuit 36 outputs a second set of partial derivative signals D2=f{dX"/dX',dX"/dY',dY"/dX', dY"/dY'}. The second set of partial derivative signals also are input to the first 2×2 matrix multiplier 32 to produce a first intermediate set of compression factor control signals for the first two cascaded effects.

The second intermediate image pixel addresses (X",Y") are input to a third module 37 (final for this illustration), which includes partial derivative circuit 38, together with the parameters F3 for the third transformation in the cascade of effects. The output from the third partial derivative circuit 38 is a third set of partial derivative signals D3=f{dX'''/dX", dX'''/dY",dY'''/dX",dY'''/dY"}. The third set of partial derivative signals and the first intermediate set of compression factor control signals are input to a second 2×2 matrix multiplier 40 to produce the output partial derivative signals for conversion to the output compression factor control signals for the adaptive lowpass filters 12. The output partial derivative signals are input to a coefficient generation circuit 41, the outputs of which are the control signals for the adaptive lowpass filters 12. The partial derivative signals with respect to X provide the coefficient signal for the adaptive horizontal lowpass filters, i.e., X=1/(SQRT(sum of the squares for X partial derivatives)), and the partial derivatives with respect to Y provide the coefficient signal for the adaptive vertical lowpass filters, i.e., Y=1/SQRT(sum of the squares for the Y partial derivatives)).

Since luminance and chrominance have different bandwidth characteristics, i.e., chrominance is sampled horizontally at half the rate of the luminance, for chrominance dX'''/dY becomes dX"/2dY, and dY'''/dX becomes 2dY'''/dX.

A typical matrix multiplier, as shown in FIG. 3, has as inputs the four coefficient values from each of two matrices, M(A,B,C,D) and M'(A',B',C',D'), where the coefficient values are the respective partial derivative signals. These coefficient values are input to respective multipliers 42–56 where pairs of the coefficient values are multiplied together. The outputs of respective pairs of the multipliers 42–56 are input to respective summation circuits 58–64 to produce an output matrix, M"(A",B",C",D").

Likewise as shown in FIG. 4 a partial differentiation circuit for the numerator of the three-dimensional planar transform may be in the form of an accumulator, with the input values for each partial derivative signal being derived from the coefficients that define the particular transform being performed. The derived coefficients are input to a summation circuit 66 and to one input of a multiplexer 68. The output from the summation circuit 66 is input to a second input of the multiplexer 68. The output from the multiplexer 68 is coupled to the input of a register 70, which in turn is clocked by the output from an AND gate 72. The AND gate 72 is enabled by a line/field enable signal during the active picture interval/lines, and the appropriate pixel/line clock signal is passed through the AND gate to latch the sum output from the multiplexer 68. The output from the register 70 is also input back to the summation circuit 66. The multiplexer 68, in response to a line/field select signal, initially loads the register 70 on the first enabled clock cycle after the line/field select signal with a first one of the derived coefficients, and then increments that first derived coefficient on successive clock cycles by the second derived coefficient to produce the accumulator output equivalent to a partial derivative signal.

As indicated above a three-dimensional planar forward transform is described by:

$$h=(Ax+By+C)/(Gx+Hy+I) \text{ and } v=(Dx+Ey+F)/(Gx+Hy+I)$$

The compression factors are computed using the partial derivatives of (h,v) with respect to (x,y) as follows. Let $U^{}2=(Gx+Hy+I)^{}2$ so the partial derivatives become:

| | |
|---|---|
| dh/dx = {(AH−BG)y + (AI−CG)}/U2 | dh/dy = {(BG−AH)x + (BI−CH)}/U2 |
| dv/dx = {(DH−EG)y + (DI−FG)}/U2 | dv/dy = {(EG−DH)x + (EI−FH)}/U2 |

Figure 5:
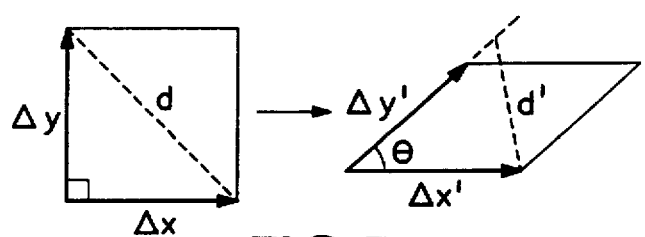
FIG. 5 is a graphic view of skew compression.

After transforming, the resultant picture image is compressed in the x direction, in the y direction, and also compressed as a result of skew between the transformed x and y axes, i.e., the x and y axes are no longer orthogonal in the target space. The skew compression is compression along the shortest of the diagonals of the image of a small square box that has been transformed into a small parallelogram, as shown in FIG. 5. The compression is defined as the length of a small line segment divided by the length of its transformed image. Thus a compression greater than one denotes shrinkage, whereas a compression less than one denotes expansion and a compression of exactly one denotes no scale changes at all.

One implementation of the anti-aliasing filters may have separate horizontal and vertical one-dimensional filters 16–22 instead of a general two-dimensional filter. In this case, the anti-aliasing filtering is done in the x and y directions. Skew compression is handled in this case by doing the following: both the x and skew compressions are multiplied together for the horizontal (x) filter control, and likewise both the y and skew compressions are multiplied together for the vertical (y) filter control.

The filter control outputs are proportional to the logarithm (Log) of the total compression in the transformed picture image. This makes it easier to compute with hardware. Since the chrominance is sampled horizontally at half the rate of the luminance, its x, y and skew compressions differ from full bandwidth video signals based on the angle of rotation of the transform.

The definition of the compression factors given above results in the following equations. For the x compression factor X and the y compression factor Y:

$$X=1/SQRT\{((dh/dx)^{}2+(dv/dx)^{}2)\} \quad Y=1/SQRT\{((dh/dy)^{}2+(dv/dy)^{}2)\}$$

The skew compression functions may be approximated by $S=SQRT(1-\cos(x))$ of the angle between unit x and y vectors, and is calculated using $\sin(\Theta)$, which is the cross product of transformed unit x and y vectors, assuming the x and y vectors are in the projected monitor (display) plane so that their z components are zero, divided by their length as follows.

$$S=f\{((dh/dx)*(dv/dy)-dv/dx)*(dh/dy))/\{SQRT((dh/dx)^{}2+(dv/dx)^{}2)*SQRT((dh/dy)^{}2+(dv/dy)^{}2)\}\}$$

Five inputs are defined to take care of any type of transformation in terms of their three-dimensional planar definitions:

$$U=(Gx+Hy+I)$$

$$Hx=(U^{**}2)(dh/dy)=(AH-BG)y+(AI-CG)$$

$$Hy=(U^{**}2)(dh/dy)=(BG-AH)x+(BI-CH)$$

$$VX=(U^{**}2)(dv/dx)=(DH-EG)y+(DI-FG)$$

$$VY=(U^{**}2)(dv/dy)=(EG-DH)x+(EI-FH)$$

Taking the Log of the above equations and redefining f so that it operates on the Log of the sine instead of the sine itself, and results in the Log of $SQRT(1-\cos(\Theta))$, produces the following results.

$$Log(X)=2ln(U)-(\tfrac{1}{2})ln(HX^{}2+Vx^{}2)$$

$$Log(Y)=2ln(U)-(\tfrac{1}{2})ln(Hy^{}2+Vy^{}2)$$

$$Log(S)=f\{ln(|Hx*Vy-Vx*Hy|)-(\tfrac{1}{2}(ln(Hx^{}2+Vx^{}2)+ln(Hy^{}2+vy^{}2))\}$$

For chrominance dh/dy becomes (½)dh/dy and dv/dx becomes 2dv/dx. Therefore the filter control factors become:

Luminance Horizontal Filter Control Factor $$XL=(2ln(U)-(\tfrac{1}{2})ln(Hx^{}2+Vx^{}2))+f\{ln(|HxVy-VxHy|)-(\tfrac{1}{2})(ln(Hx^{}2+Vx^{}2)+ln(Hy^{}2+Vy^{}2))\}$$

Luminance Vertical FCF $$YL=(2ln(U)-(\tfrac{1}{2})ln(Hy^{}2+Vy^{}2))+f\{ln(|NxVy-VxHy|)-(\tfrac{1}{2})(ln(Hx^{}2+Vx^{}2)+ln(Hy^{}2+Vy^{}2))\}$$

Chrominance Horizontal FCF $$XC=(2ln(U)-(\tfrac{1}{2})ln(Hx^{}2+4Vx^{}2))+f\{ln(|HxVy-VxHy|)-(\tfrac{1}{2})(ln(Hx^{}2+4vx^{}2)+ln((\tfrac{1}{4})Hy^{}2+Vy^{}2))\}$$

Chrominance Vertical FCF $$YC=2ln(U)-(\tfrac{1}{2})ln((\tfrac{1}{4})Hy^{}2+Vy^{}2))+f\{ln(|HxVy-VxHy|)-(\tfrac{1}{2})(ln(Hx^{}2+4Vx^{}2)+ln((\tfrac{1}{4})Hy^{}2+Vy^{}2))\}$$

These four FCFs are used to select the appropriate filter 16–22 from pre-defined filter banks by the filter control circuit 14.

An example of a composite function where a two-dimensional warp function precedes the three-dimensional planar transform and projection are the transform equations as follow:

warp (x,y) functions:

$$Xw=W(x,y)$$

$$Yw=Z(x,y)$$

3D planar projection transform:

$$X(x,y)=(Ax+By+C)/(Gx+Hy+I)$$

$$Y(x,y)=(Dx+Ey+F)/(Gx+Hy+I)$$

and the composite transform is:

$$h(x,y)=X(W(x,y),Z(x,y))=X(W,Z)$$

$$v(x,y)=Y(W(x,y),Z(x,y))=Y(W,Z)$$

Using the chain rule the partials are:

$$dh/dx=(dX/dW)(dW/dx)+(dX/dZ)(dZ/dx)$$

$$dh/dy=(dX/dW)(dW/dy)+(dX/dZ)(dZ/dy)$$

$$dv/dx=(dY/dW)(dW/dx)+(dY/dZ)(dZ/dx)$$

$$dv/dy=(dY/dW)(dW/dy)+(dY/dZ)(dZ/dy)$$

Defining four new values equivalent to Hx, Hy, Vx, Vy above and redefining U to take into account the warp mapping produces:

$$U=GW+HZ+I$$

$$Xx=(AH-BG)Z+(AI-CG)=U^{**}2(dX/dW)$$

$$xy=(BG-AH)W+(BI-CH)=U^{**}2(dX/dZ)$$

$$Yx=(DH-EG)Z+(DI-FG)=U^{**}2(dY/dW)$$

$$Yy=(EG-DH)W+(EI-FH)=U^{**}2(dY/dZ)$$

and $$\begin{aligned}Hx &= U^{}2(dh/dx) \\ &= U^{}2\{(dX/dW)(dW/dx)+(dX/dZ)(dZ/dx)\} \\ &= Xx(dW/dx)+Xy(dZ/dx)\end{aligned}$$

$$\begin{aligned}Hy &= U^{}2(dh/dy) \\ &= U^{}2\{(dX/dW)(dW/dy)+(dX/dZ)(dZ/dy)\} \\ &= Xx(dW/dy)+Xy(dZ/dy)\end{aligned}$$

$$\begin{aligned}Vx &= U^{}2(dv/dx) \\ &= U^{}2\{(dY/dW)(dW/dx)+(dY/dZ)(dZ/dx)\} \\ &= Yx(dW/dx)+Yy(dZ/dx)\end{aligned}$$

$$\begin{aligned}Vy &= U^{}2(dv/dy) \\ &= U^{}2\{(dY/dW)(dW/dy)+(dY/dZ)(dZ/dy)\} \\ &= Yx(dW/dy)+Yy(dZ/dy)\end{aligned}$$

The same hardware used to generate the filter compression factors from these values in the three-dimensional planar case may be used to handle this two-dimensional warp. To generate the necessary inputs, six values that depend on the warp are computed using a table. These values are:

$$W(x,y),Z(x,y),dW/dx(x,y),dW/dy(x,y),dZ/dx(x,y),dZ/dy(x,y)$$

The first two values are used to determine Xx, Xy, Yx, Yy and U. Then these with the last four values are used to determine Hx, Hy, Vx and Vy. These results go to the hardware already defined above for the three-dimensional planar case.

For a non-planar three-dimensional transform, fix the coordinate system with the observer's eye located at (0,0,0)

and the monitor on the plane (x,y,1) with the eye looking in the (0,0,1) direction. If the intermediate variables are (S,T, U), the perspective projection is:

$$h=S/U \text{ and } v=T/U$$

The partial derivatives are $$dh/dx=(U(dU/dx)-S(dU/dx))/U^{**}2$$

$$dh/dy=(U(dS/dy)-S(dU/dy))/U^{**}2$$

$$dv/dx=(U(dT/dx)-T(dU/dx))/U^{**}2$$

$$dv/dy=(U(dT/dy)-T(dU/dy))/U^{**}2$$

These also may be used to calculate Hx, Hy, Vx and Vy.

To add the two-dimensional warp ahead of the three-dimensional warp the same thing is done as in the three-dimensional planar case above. The resulting partials are:

$$dh/dx=\{U((dS/dW)(dW/dx)+(dS/dZ)(dZ/dx))-S((dU/dW)(dW/dx)+(dU/dZ)(dZ/dx))\}/U^{**}2$$

$$dh/dy=\{U((dS/dW)(dW/dy)+(dS/dZ)(dZ/dy))-S((dU/dW)(dW/dy)+(dU/dZ)(dZ/dy))\}/U^{**}2$$

$$dv/dx=\{U((dT/dW)(dW/dx)+(dT/dZ)(dZ/dx)-T((dU/dW)(dW/dx)+(dU/dZ)(dZ/dx))\}/U^{**}2$$

$$dv/dy=\{U((dT/dW)(dW/dy)+(dT/dZ)(dZ/dy)-T((dU/dW)(dW/dy)+(dU/dZ)(dZ/dy))\}/U^{**}2$$

with W, Z, dW/dx, dW/dy, dZ/dx and dZ/dy evaluated at (x,y) and U, dU/dW, dU/dZ, dS/dW, dS/dZ, dT/dW and dT/dZ evaluated at (W,Z).

Referring again to FIG. 2 the partials dW/dx, dW/dy, dZ/dx and dZ/dx are output from the first partial derivative circuit 30, and the transform values W and Z are output from the first transform circuit 28.

Thus the present invention provides cascaded anti-aliasing filter control for sampled images by chaining together component transforms, taking the partial derivatives for each transform, and combining the partial derivatives in successive multiplying matrices, the outputs from the final multiplying matrix being convened into filter control signals for respective adaptive lowpass filters.

What is claimed is:

1. An apparatus for generating filter control signals in response to a video transform having a cascade of video effects comprising:

an address generator for generating an initial pixel address signal;

a plurality of modules coupled in a chain, one module for each of the video effects in the cascade, each module having as inputs constants determined by the particular video effect and a pixel address signal and having as outputs a new pixel address signal and a partial derivative signal representing a plurality of partial derivatives, the new pixel address signal being the pixel address signal input to a next module in the chain and the initial pixel address signal being the pixel address signal input to a first module in the chain; and a plurality of multiplying matrixes coupled in a chain, the number of multiplying matrices being one less than the number of modules, a first multiplying matrix in the chain having as inputs the partial derivative signal from the first two modules in the chain and having as an output an intermediate partial derivative signal, the output being coupled to one input of a next multiplying matrix which has the partial derivative signal from the next module as another input, the output from a last multiplying matrix being used to form the filter control signals.

2. The apparatus as recited in claim 1 wherein each module comprises:

a transform circuit having as inputs the constants determined by the particular video effect for the module and the pixel address signal to provide the new pixel address signal; and a partial derivative circuit having as inputs the constants determined by the particular video effect for the module and the pixel address signal to provide the partial derivative signal.

3. The apparatus as recited in claim 2 wherein the partial derivative circuit comprises a plurality of accumulators, one for each partial derivative of the partial derivative signal, with the input values for each partial derivative being derived from the constants determined by the particular video effect for the module.

4. The apparatus as recited in claim 1 wherein each multiplier matrix comprises:

a plurality of multipliers, one for each partial derivative of the partial derivative signals input, each multiplier having as inputs one of the partial derivatives for each of the multiplier matrix inputs; and a plurality of summation circuits for combining specified pairs of the multipliers to produce the intermediate partial derivative signal.

5. An apparatus for generating filter control signal in response to a video transform having a cascade of three video effects comprising:

means for generating from video timing signals an initial address signal;

a first module having as inputs the initial address signal and a first set of constants defining a first video effect from the cascade, and having as outputs a first intermediate address signal and a first partial derivative signal;

a second module having as inputs the first intermediate address and a second set of constants defining a second video effect in the cascade, and having as outputs a second intermediate address signal and a second partial derivative signal;

a first matrix multiplier having as inputs the first and second partial derivative signals and having as an output a first intermediate partial derivative signal;

a third module having as inputs the second intermediate address signal and a third set of constants defining a third video effect in the cascade, and having as an output a third partial derivative signal;

a second matrix multiplier having as inputs the first intermediate and third partial derivative signals and having as an output a final partial derivative signal; and means for generating from the final partial derivative signal the filter control signals.

* * * * *